United States Patent [19]

Linhart et al.

[11] Patent Number: 4,468,349
[45] Date of Patent: Aug. 28, 1984

[54] PROCESS FOR THE PREPARATION OF SOLUTIONS OF CATIONIC AZO DYESTUFFS

[75] Inventors: Karl Linhart, Leverkusen; Harald Gleinig, Odenthal-Neschen; Günther Boehmke, Leverkusen; Kurt Breig, Cologne, all of Fed. Rep. of Germany

[73] Assignee: Bayer Aktiengesellschaft, Leverkusen, Fed. Rep. of Germany

[21] Appl. No.: 288,567

[22] Filed: Jul. 30, 1981

[30] Foreign Application Priority Data

Aug. 16, 1980 [DE] Fed. Rep. of Germany ....... 3030918

[51] Int. Cl.$^3$ .................. C07C 107/06; C07C 107/08; C07C 107/04
[52] U.S. Cl. .................................... 260/205; 260/206; 260/207; 260/207.1
[58] Field of Search ............. 260/205, 206, 207, 207.1

[56] References Cited

U.S. PATENT DOCUMENTS

| | | | |
|---|---|---|---|
| 2,478,767 | 7/1949 | Locke et al. | |
| 3,793,305 | 2/1974 | Balon | 260/205 UX |
| 3,941,768 | 3/1976 | Stocker | 260/205 UX |
| 4,058,517 | 11/1977 | Bermes | 260/205 UX |

FOREIGN PATENT DOCUMENTS

| | | |
|---|---|---|
| 1162665 | 1/1967 | Fed. Rep. of Germany . |
| 1644323 | 4/1977 | Fed. Rep. of Germany . |
| 1355911 | 12/1965 | France . |
| 1578454 | 8/1969 | France . |
| 2219204 | 9/1974 | France .............................. 260/205 |

*Primary Examiner*—Paul F. Shaver
*Attorney, Agent, or Firm*—Sprung Horn Kramer & Woods

[57] ABSTRACT

Concentrated stable solutions of cationic azo dyestuffs of the formula

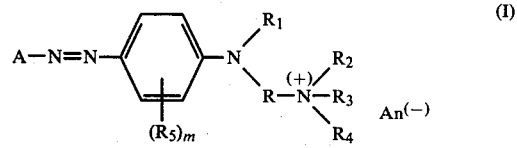

wherein
A denotes the radical of an aromatic-carbocyclic or aromatic-heterocyclic diazo component,
R denotes alkylene,
$R_1$ denotes hydrogen or alkyl,
$R_2$ denotes alkyl, alkenyl or aralkyl,
$R_3$ denotes alkyl,
$R_4$ denotes hydroxyalkyl with 2 or more C atoms,
$R_5$ denotes halogen, alkyl, alkoxy, aryloxy, acyl or acylamino,
m denotes 0, 1, 2, 3 or 4 and
$An^{(-)}$ denotes a carboxylate ion, and wherein the cyclic and acyclic substituents can carry further non-ionic substituents, which solutions have a low salt content, are prepared by simultaneously reacting amines of the formula

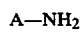 (II)

coupling components of the formula

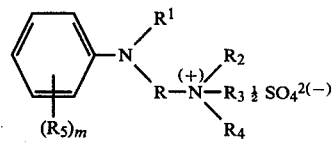 (III)

and alkali metal nitrites or alkaline earth metal nitrites in aqueous carboxylic acids and, if appropriate, organic water-soluble solvents, and then separating off the alkali metal sulphates or alkaline earth metal sulphates which thereby crystallize out.

6 Claims, No Drawings

PROCESS FOR THE PREPARATION OF SOLUTIONS OF CATIONIC AZO DYESTUFFS

The present invention relates to a process for the preparation of concentrated stable solutions of cationic azo dyestuffs of the formula

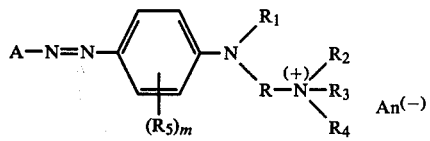

wherein
A denotes the radical of an aromatic-carbocyclic or aromatic-heterocyclic diazo component,
R denotes alkylene,
$R_1$ denotes hydrogen or alkyl,
$R_2$ denotes alkyl, alkenyl or aralkyl,
$R_3$ denotes alkyl,
$R_4$ denotes hydroxyalkyl with 2 or more C atoms,
$R_5$ denotes halogen, alkyl, alkoxy, aryloxy, acyl or acylamino,
m denotes 0, 1, 2, 3 or 4 and
$An^{(-)}$ denotes a carboxylate ion,
and wherein the cyclic and acyclic substituents can carry further non-ionic substituents, which solutions have a low salt content, by simultaneously reacting amines of the formula

coupling components of the formula

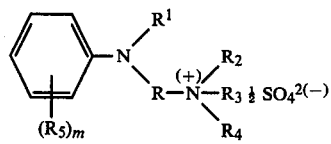

and alkali metal nitrites or alkaline earth metal nitrites in aqueous carboxylic acids and, if appropriate, organic water-soluble solvents, and then separating off the alkali metal sulphates or alkaline earth metal sulphates which thereby crystallise out.

The solutions prepared in this manner preferably contain 10-60% by weight of the cationic dyestuff, 10-80% by weight of a water-soluble carboxylic acid, 0-20% by weight of a water-soluble organic solvent and 3-30% by weight of water.

Non-ionic substituents on the dyestuffs I are the substituents which are customary in dyestuff chemistry and do not dissociate under the preparation and use conditions, such a cyano, hydroxyl, halogen, such as fluorine, chlorine or bromine, nitro, alkyl, mono- and dialkylamino, phenyl, alkoxy, acyloxy, alkoxycarbonyl, alkoxycarbonyloxy, phenoxy, benzyloxy, sulphonamido, carboxamido, alkylsulphonyl, phenylsulphonyl, alkylmercapto or phenylmercapto.

Particularly suitable alkyl radicals are those with 1-4 C atoms.

Particularly suitable radicals $R_4$ are 2-hydroxypropyl or -butyl radicals which are unsubstituted or substituted by $C_1$-$C_4$-alkoxy, $C_2$-$C_4$-alkenyloxy, phenoxy or benzyloxy.

Suitable radicals R are, for example, straight-chain or branched alkylene radicals which have 2-5 C atoms and can be substituted; from example a methylene group can be replaced by a carbonyl group.

Suitable aryl radicals are, in particular, optionally substituted phenyl and naphthyl radicals.

Suitable acyl radicals are, in particular, alkylcarbonyl and alkylsulphonyl radicals with 1-4 C atoms in the alkyl radical, or benzoyl.

Dyestuffs which can preferably be prepared in this manner have the formula

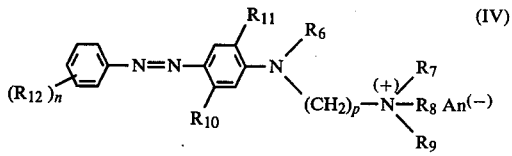

wherein
$R_6$, $R_7$, $R_8$, $R_9$ denote methyl, ethyl, propyl or butyl, or 2-hydroxyethyl, 2-hydroxpropyl, 2-hydroxybutyl, 2-hydroxyethylphenyl, 2-hydroxy-3-methoxy-propyl, 2-hydroxy-3-chloro-propyl, 2-hydroxy-3-ethoxy-propyl, 2-hydroxy-3-propoxy-propyl, 2-hydroxy-3-allyloxy-propyl, 2-hydroxy-3-butoxy-propyl, 2-hydroxy-3-phenoxy-propyl or 2-hydroxy-3-benzoxy-propyl,
$R_{10}$ denotes hydrogen, methyl, ethyl, propyl, butyl, halogen, methoxy, ethoxy, propoxy or acetyl-, propionyl- or methylsulphonyl-amino,
$R_{11}$ denotes hydrogen, methyl, ethyl, propyl, butyl, halogen, methoxy, ethoxy or propoxy,
$R_{12}$ denotes methyl, ethyl, propyl, butyl, halogen, cyano, nitro, methoxy, ethoxy, propoxy, methoxy- or ethoxy-carbonyl, acetoxy, acetyl, sulphonamido or carboxamido,
n denotes a number from 1 to 5,
p denotes 2 or 3 and
$An^{(-)}$ denotes a carboxylate anion, or

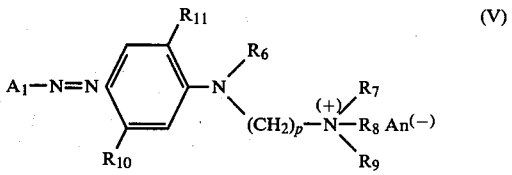

wherein $A_1$ represents a radical of the formula

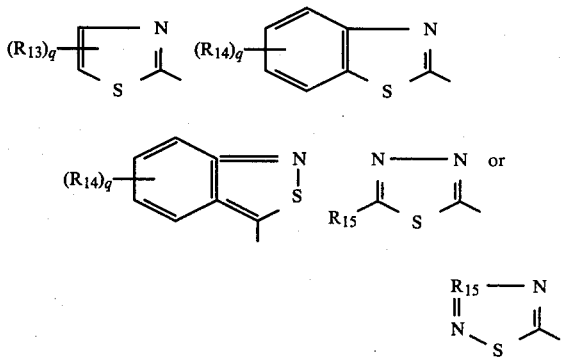

in which $R_{13}$ denotes $C_1$-$C_5$-alkyl, phenyl, cyano, nitro or carbomethoxy, $R_{14}$ denotes $C_1$-$C_5$-alkyl, $C_1$-$C_4$-alkoxy, phenoxy, nitro, carbomethoxy or halogen, $R_{15}$ denotes hydrogen; $C_1$-$C_5$-alkyl; $C_1$-$C_4$-alkoxy; phenoxy; cyclohexyl; phenyl; phenyl which is substituted by methyl, ethyl, methoxy, ethoxy, nitro, chlorine or acetylamino; benzyl; methyl-, ethyl- or phenyl-mercapto or benzylmercapto; dimethyl- or diethyl-amino or methyl-, ethyl- or phenyl-sulphonyl and q denotes 0, 1 or 2,
and wherein $R_6$-$R_{11}$, p and $An^{(-)}$ have the meaning given in the case of formula IV.

Of these dyestuffs, those in which n denotes a number from 1 to 3, q denotes 0 or 1, $R_6$, $R_7$ and $R_8$ denote methyl or ethyl, $R_9$ denotes 2-hydroxypropyl, $R_{10}$ and $R_{11}$ denote hydrogen or methyl, $R_{12}$ denotes chlorine, bromine, cyano or nitro, $R_{13}$, $R_{14}$ and $R_{15}$ denote hydrogen, phenyl or nitro and $An^{(-)}$ denotes acetate, are preferred.

Suitable amines II, suitable coupling components III and suitable amines of the formula

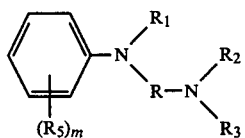

VI which can be converted into the coupling components III by alkoxylation, are described in U.S. Pat. No. 4,036,826.

Possible water-soluble carboxylic acids are, in particular, $C_1$-$C_3$-carboxylic acids, such as formic acid, acetic acid, propionic acid, mono-, di and tri-chloro-acetic acid and lactic acid, preferably acetic acid and propionic acid.

Examples of organic water-soluble solvents are alcohols, such as ethanol, iso-propanol, and iso- and n-butanol, glycols, such as ethylene glycol, propylene glycol, diethylene glycol and triethylene glycol, monoalkyl and dialkyl glycol ethers, such as methylglycol and dimethylglycol, dimethylformamide, caproplactam and methylpyrolidone.

The process is preferably carried out by a procedure in which the amine II and the coupling component III are suspended in the aqueous carboxylic acid, if appropriate with the addition of an organic solvent, and the suspension is cooled, for example to 0-5° C. With addition of the nitrite, preferably sodium nitrite, simultaneous diazotisation and coupling is then carried out at 0-40 C., in particular at room temperature. When the reaction has ended, the sulphate which has precipitated, preferably sodium sulphate in the form of the 7-10 hydrate, is separated off at temperatures below 30° C., for example at room temperature.

Instead of the sulphates III, it is also possible to use the corresponding hydroxides or carboxylates, for example acetates, and the equivalent amount of sulphuric acid in the reaction.

A further variant of the process is the possibility of mixing different diazo components and one cationic coupling component, which are simultaneously diazotised and coupled, in order to obtain a finished dyestuff solution with the desired colour shade.

The process according to the invention provides the surprising possibility of preparing highly concentrated, stable solutions of cationic dyestuffs, the physical stability of which is ensured by the extremely low content of inorganic salts of less than 1%, preferably of less than 0.25%. The solutions, which are prepared in a very simple manner, can be marketed without further purification.

In spite of the absence of intermediate isolation of the dyestuffs, which generally serves to remove non-coupled intermediate products or decomposition products, perfect dyeing results are achieved which, from the point of view of shade and fastness properties, are not below the standard of those obtained with dyestuffs purified by the processes used hitherto.

From the state of the art, it could not be seen that it is possible to carry out simultaneous diazotisation and coupling in carboxylic acids with a high concentration of the components without the formation of decomposition products—from the diazonium salts—and by-products—from undesired coupling or nitrosation reactions. Furthermore, no useful solution has hitherto existed for removal of the cation introduction by the nitrite. The known use of nitric acid esters or the known reactions are processes which can be performed only with a great deal of technical effort.

It could thus not be predicted that conditions which simultaneously permit quantitative reaction to give the dyestuff and almost complete separation of the precipitated inorganic salts from the dissolved dyestuff have been discovered by the process according to the invention, that is to say by the choice of coupling component—which is the sulphate of a hydroxyalkylated ammonium compound—the substance which is a source of nitrous acid and the solvent. Variation of only one of the parameters mentioned means that these advantages cannot be achieved.

The dyestuffs in the solutions which can be prepared according to the invention are known, for example from U.S. Pat. No. 4,036,826 and DE-OS (German Published Specification) No. 1,644,323: as is known, they are suitable for dyeing and printing fibers, woven fabrics and non-woven fabrics of polymers of acrylonitrile or 1,1-dicyanoethylene or copolymers of these components and other vinyl compounds, such as vinyl chloride, vinylidene chloride, vinyl acetate, vinylpyridine, vinylimidazole, acrylates and methacrylates; of acid-modified polyesters, such as are described, for example, in U.S. Pat. Nos. 2,893,816, 3,018,272 and 3,166,531, and of acid-modified polyamides, such as are decribed, for example, in U.S. Pat. Nos. 3,039,009 and 3,454,351.

Furthermore, cellulose fibers and lignin-containing fibrous materials such as are used for the production of non-woven materials, absorbent paper and sized writing paper and packaging paper, can also be dyed in shades which are outstandingly fast to light using these dyestuffs. Even at the liquor ratio of 1:100 - 1,000 which is customary in the production of paper, they are absorbed completely and give a colourless effluent.

It is known that certain azo dyestuffs can be prepared by a one-stage diazotisation/coupling process.

U.S. Pat. No. 2,478,768 describes a one-stage process for the preparation of water-insoluble pigments, in which the diazotisation and coupling are carried out at a pH value <6. In this process, water-insoluble Ba salts of the azo dyestuffs are eliminated from further side reactions by continuous precipitation. A similar process, in which the diazotisation and coupling are kept in the pH range between 6.0 and 7.2, is described in U.S. Pat. No. 2,478,767.

U.S. Pat. No. 2,418,416 describes a process in which the diazotisation is carried out at pH<4 and the coupling is carried out at pH>4. Such a process can lead to decomposition of some of the diazo compound before the coupling reaction.

DE-OS (German Published Specification) No. 1,927,453 describes a process for the preparation of metal-free azo pigments by diazotisation and coupling in organic solvents which contain at most 10% of water. This process proceeds in a heterogeneous phase system.

DE-OS (German Published Specification) No. 2,058,299 describes a similar process, with the difference that the reaction mixture is anhydrous and an organic acid with a pH value<3 is added in an amount of <1 mol per mol of amine. As a result of carrying out the reaction in an anhydrous medium, it is necessary to add esters of nitrous acid. These must be prepared separately and must be handled under very stringent safety measures.

DE-AS (German Published Specification) No. 2,139,311 describes a process for the one-stage preparation of azo dyestuffs in which the pH value for the diazotisation and coupling is 4 or less if the reaction mixture is diluted with 25% of its volume of water. In the examples, amounts of 17–127 mols of acetic acid per mol of amine are used, as a result of which these processes cannot be used for the preparation of concentrated liquid products.

British Patent Specification No. 2 099 208 A describes simultaneous diazotisation and coupling of coupling components, which are substituted by pyridinium chloride, in acetic acid and ethylene glycol at a pH value of 2.8, when the reaction mixture is diluted with 25% of water. It is not possible to separate off the inorganic salts by filtration.

In British Patent Specification No. 1,162,665, the diazotisation and coupling are carried out in acid solution and the dyestuffs are salted out or isolated as a ZnCl₂ double salt.

EXAMPLE 1

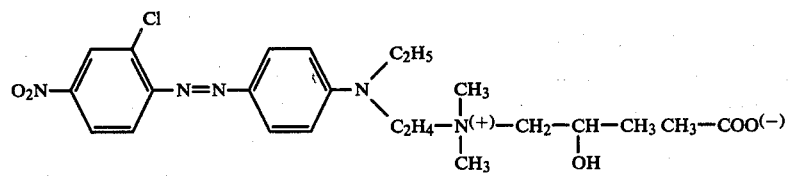

A suspension of 1 mol (226.2 g of a 76.25% strength aqueous formulation) of o-chloro-p-nitroaniline, 200 ml (3.33 mols) of glacial acetic acid, 1 mol (479.2 g of a 62.4% strength aqueous formulation) of N-ethyl-N-(dimethyl-hydroxypropyl-ammonium)-ethyl-aniline sulphate and 95 g of 6-caprolactam is cooled to 5° C., and the pH is adjusted to 4.5 with 40% strength sodium hydroxide solution (about 40 ml). 69 g (1 mol) of sodium nitrite are introduced in the course of 120 minutes. After a further 120 minutes, the simultaneous diazotisation and coupling has ended. The sodium sulphate which is formed in the reaction and precipitates quantitatively overnight is separated off by filtration. At the end of the reaction, the pH value is 5.3. 1.07 kg of dyestuff solution are obtained. A red dyestuff is formed in quantitative yield.

EXAMPLE 2

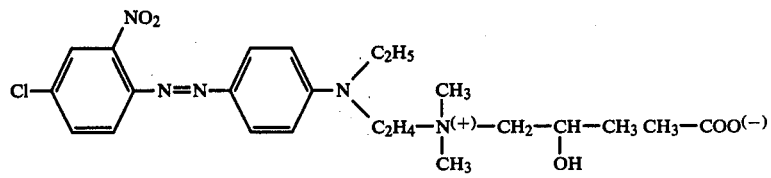

1 mol (305.3 g of a 56% strength aqueous formulation) of p-chloro-o-nitroaniline, 1 mol (479.2 g of a 62.4% strength aqueous formulation) of N-ethyl-N-(dimethyl-hydroxypropyl-ammonium)-ethyl-aniline sulphate, 95 g of 6-caprolactam and 1 mol of sodium nitrite are stirred together and the mixture is cooled to a temperature of 5° C. The pH value of the suspension, which contains 25% of water, is 4.5. 200 ml of glacial acetic acid are added dropwise in the course of 3 hours. During this addition, the pH value rises to 5.5. Diazotisation and coupling have ended immediately after the addition of the acetic acid. In order to precipitate quantitatively the sodium sulphate formed during the reaction, the mixture is subsequently stirred for 15 hours. After filtration, 1 kg of a yellow dyestuff solution is obtained. The yield is quantitative.

EXAMPLE 3

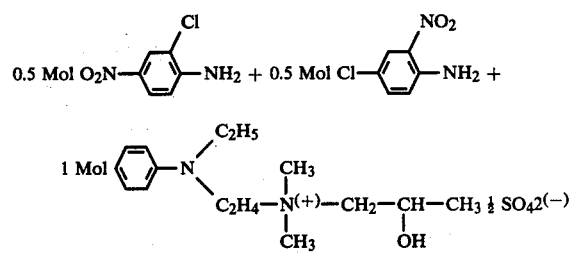

0.5 mol (113.1 g of a 75% strength aqueous formulation) of o-chloro-p-nitroaniline, 0.5 mol (152.65 g of a 56.5% strength aqueous formulation) of p-chloro-o-nitroaniline, 1 mol (479.2 g of a 62.4% strength aqueous formulation) of N-ethyl-N-(dimethyl-hydroxypropyl-ammonium)-ethyl-aniline sulphate, 67.8 g of 6-caprolactam and 132 ml of glacial acetic acid are stirred, and the mixture is cooled to 5° C. The pH value is adjusted to 4.5 with about 25 ml of 40% strength by volume sodium hydroxide solution. 1 mol of solid sodium nitrite is introduced in the course of 120 minutes. After a further 120 minutes, the diazotisation and coupling have ended.

The sodium sulphate formed during the reaction precipitates quantitatively overnight and is filtered off. About 1 kg of dyestuff solution is obtained. The yield is quantitative. Any desired shade from yellow to red can be produced by varying the molar proportions of the two chloronitroanilines.

EXAMPLE 4

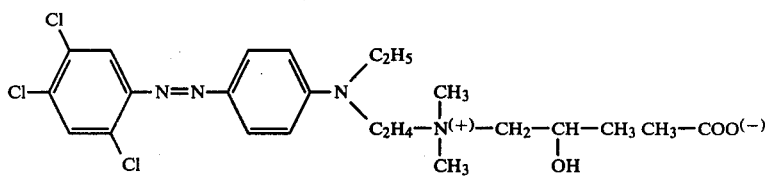

1 mol (260 of a 75.5% strength aqueous formulation) of 2,4,5-trichloroaniline, 1 mol (479.2 g of a 62.4% strength aqueous formulation) of N-ethyl-N-(dimethyl-hydroxypropyl-ammonium)-ethyl-aniline sulphate and 1 mol of sodium nitrite are stirred, and the mixture is cooled to 5° C. pH: 6.2. 300 ml of glacial acetic acid are added dropwise to the suspension in the course of 180 minutes, and the mixture is subsequently stirred for 5 hours. At the end of the reaction, the pH value is 5.5. After separating off the undissolved salts by filtration, about 950 g of a yellow dyestuff solution are obtained.

EXAMPLE 5

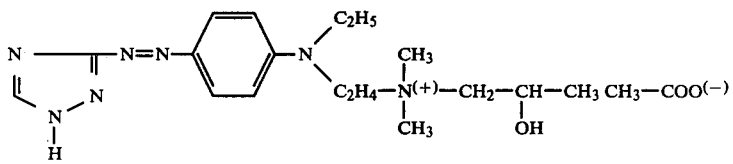

1 mol of 3-amino-1,2,4-triazole, 1 mol (479.2 g of a 62.4% strength aqueous formulation) of N-ethyl-N-(dimethyl-hydroxypropyl-ammonium)-ethyl-aniline sulphate, 100 g of 6-caprolactam and 200 ml of glacial acetic acid are stirred, and the mixture is warmed to 65° C. A clear solution is formed. The solution is then cooled to 10° C., and 1 mol of sodium nitrite is added. 100 ml of H₂O are added dropwise in the course of 3 hours. The temperature is kept at 10° C. by external cooling. After a further 3 hours, the diazotisation and coupling have ended. pH value: 4.8. The Na₂SO₄ which has precipitated is separated off by filtration. A stable orange-coloured solution is obtained.

EXAMPLE 6

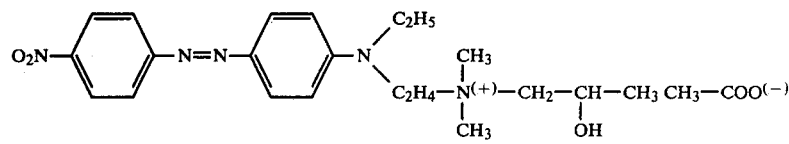

1 mol (176 g of a 78.3% strength aqueous formulation) of p-nitroaniline, 1 mol (479.2 g of a 62.4% strength aqueous formulation) of N-ethyl-N-(dimethyl-hydroxypropyl-ammonium)-ethyl-aniline, 200 ml of glacial acetic acid and 100 g of 6-caprolactam are stirred, and the mixture is cooled to 5° C. 1 mol of sodium nitrite is added in the course of 2 hours. After a further 2 hours, the diazotisation and coupling have ended. pH value: 4.7. The Na₂SO₄ which has precipitated is separated off by filtration. A stable red solution is obtained.

EXAMPLE 7

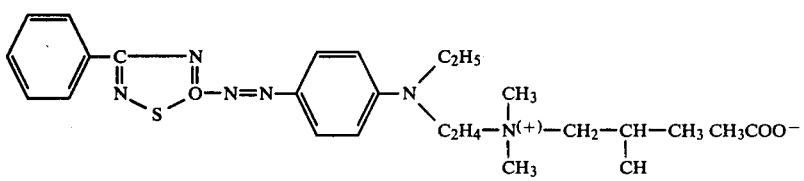

1 mol (179.5 g of a 98.5% strength aqueous formulation) of 3-phenyl-5-amino-1,2,4-thiadiazole , 1 mol (479.2 g of a 62.4% strength aqueous formulation) of N-ethyl-N-(dimethyl-hydroxypropyl-ammonium)-ethyl-aniline sulphate and 300 g of ethylene glycol are stirred, and the mixture is cooled to 5° C. After adding 1 mol of NaNO₂, a mixture of 200 ml of glacial acetic acid and 60 ml of H₂O is added dropwise in the course of 3 hours. During this addition, the pH value is between 3 and 4.5. After a further 2 hours, the diazotisation and coupling have ended. The Na₂SO₄ which has precipitated is separated off by filtration. A stable red solution is obtained.

EXAMPLE 8

1 mol (226.2 g of a 76.25% strength aqueous formulation) of o-chloro-p-nitroaniline, 1 mol (479.2 g of a 62.4% strength aqueous formulation) of N-ethyl-N-(dimethyl-hydroxypropyl-ammonium)-ethyl-aniline acetate, 1 mol of glacial acetic acid, 0.5 mol (51.1 g) of sulphuric acid and 100 g of 6-caprolactam are stirred, and the mixture is cooled at 5° C. 1 mol of sodium nitrite is introduced in the course of 120 minutes. After a further 120 minutes, the simultaneous diazotisation and coupling have ended. The sodium sulphate which has precipitated is separated off by filtration. A red dyestuff is obtained in quantitative yield in a stable, highly concentrated solution.

We claim:

1. In the preparation of concentrated stable solutions of cationic azo dyestuffs of the formula

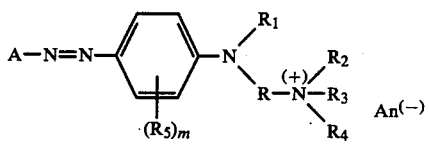

wherein
- A denotes the radical of an aromatic-carbocyclic or aromatic-heterocyclic diazo component,
- R denotes alkylene,
- $R_1$ denotes hydrogen or alkyl,
- $R_2$ denotes alkyl, alkenyl or aralkyl,
- $R_3$ denotes alkyl,
- $R_4$ denotes hydroxyalkyl with 2 or more C atoms,
- $R_5$ denotes halogen, alkyl, alkoxy, aryloxy, acyl or acylamino,
- m denotes 0, 1, 2, 3 or 4 and
- $An^{(-)}$ denotes a carboxylate ion, and wherein the cyclic and acyclic substituents can carry further non-ionic substituents, which solutions have a low salt content, by coupling, the improvement which comprises simultaneously reacting amines of the formula

coupling components of the formula

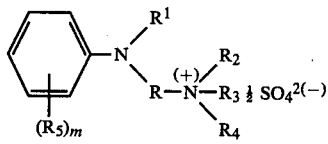

and alkali metal nitrites or alkaline earth metal nitrites in aqueous carboxylic acids, and separating off the alkali metal sulphates or alkaline earth metal sulphates which thereby crystallize out.

2. Process according to claim 1, wherein solutions which contain 10–60% by weight of the cationic dyestuff, 10–80% by weight of the water-soluble carboxylic acid, 2–20% by weight of the water-soluble organic solvent and 3–30% by weight of water are prepared.

3. Process according to claim 1, wherein the reactants are employed in equimolar amounts.

4. Process according to claim 1, wherein acetic acid is used as the carboxylic acid.

5. Process according to claim 1, wherein the aqueous carboxylic acid further contains an organic water-soluble solvent.

6. Process according to claim 5, wherein the organic water-soluble solvent is ethylene glycol or caprolactam.

* * * * *